US012774378B2

(12) United States Patent
Schmitt et al.

(10) Patent No.: US 12,774,378 B2
(45) Date of Patent: Oct. 27, 2026

(54) USE OF COLORED EFFECT PIGMENTS FOR ENHANCING THE INFRARED ABSORPTION CAPACITY OF COLORED POLYMERS

(71) Applicant: Merck Patent GmbH, Darmstadt (DE)

(72) Inventors: Adeliene Schmitt, Ludwigshafen (DE); Laurent Deloux, Darmstadt (DE); Gordon Price, Nottingham (GB); Claudio Brighina, Darmstadt (DE)

(73) Assignee: SUSONITY COMMERCIAL GMBH, Gernsheim (DE)

( * ) Notice: Subject to any disclaimer, the term of this patent is extended or adjusted under 35 U.S.C. 154(b) by 763 days.

(21) Appl. No.: 17/911,671

(22) PCT Filed: Mar. 12, 2021

(86) PCT No.: PCT/EP2021/056330

§ 371 (c)(1),
(2) Date: Sep. 15, 2022

(87) PCT Pub. No.: WO2021/185693

PCT Pub. Date: Sep. 23, 2021

(65) Prior Publication Data

US 2023/0145396 A1 May 11, 2023

(30) Foreign Application Priority Data

Mar. 16, 2020 (EP) .................................... 20163302

(51) Int. Cl.
*C08K 3/04* (2006.01)
*C08J 3/20* (2006.01)

(52) U.S. Cl.
CPC *C08K 3/04* (2013.01); *C08J 3/20* (2013.01); *C08J 2300/22* (2013.01); *C08J 2300/24* (2013.01); *C08K 2201/011* (2013.01)

(58) Field of Classification Search
None
See application file for complete search history.

(56) References Cited

U.S. PATENT DOCUMENTS

| | | | | |
|---|---|---|---|---|
| 3,087,827 | A | 4/1963 | Klenke, Jr. et al. | |
| 4,076,551 | A | 2/1978 | Bernhard et al. | |
| 5,286,291 | A * | 2/1994 | Bernhardt | C08K 9/02 106/490 |
| 5,501,731 | A * | 3/1996 | Schmid | C09C 1/0015 106/459 |
| 5,952,249 | A * | 9/1999 | Gibson | F16D 69/023 442/178 |
| 8,552,099 | B2 | 10/2013 | Jarvis et al. | |
| 8,932,512 | B2 | 1/2015 | Edler et al. | |
| 10,240,045 | B2 | 3/2019 | Rueger et al. | |
| 10,266,699 | B2 | 4/2019 | Rueger et al. | |
| 2017/0321057 | A1* | 11/2017 | Rueger | C09D 7/61 |
| 2017/0321058 | A1* | 11/2017 | Rueger | C04B 35/62839 |
| 2021/0087406 | A1* | 3/2021 | Sanchez | H01L 21/02164 |
| 2021/0179856 | A1* | 6/2021 | Schmitt | A61Q 1/02 |

FOREIGN PATENT DOCUMENTS

| | | | | |
|---|---|---|---|---|
| CN | 107124885 B | 11/2019 | | |
| DE | 102014018275 A1 | 6/2016 | | |
| EP | 1756221 B1 | 6/2016 | | |
| EP | 3795645 A1 * | 3/2021 | | A61K 8/0245 |

OTHER PUBLICATIONS

Guo et al., Experimental Demonstration of Total Absorption over 99% in the Near Infrared for Monolayer-Graphene-Based Subwavelength Structures. Adv. Optical Mater, 4, 1955-1960 (Year: 2016).*

F. Atamny et al. "Microstructure of Nanocrystalline Carbon Allotropes: Application of STM to Loose Particles" Ultramicroscopy, vol. 48, 1993, pp. 281-289.

Search report in PCT/EP2021/056330 dated May 11, 2021 (pp. 1-3).

* cited by examiner

*Primary Examiner* — Katarzyna I Kolb
(74) *Attorney, Agent, or Firm* — Csaba Henter; MILLEN, WHITE, ZELANO & BRANIGAN, P.C.

(57) ABSTRACT

The present invention is related to the use of colored effect pigments for enhancing the infrared absorption capacity of colored polymers and to a method for enhancing the infrared absorption capacity of colored polymers.

19 Claims, 4 Drawing Sheets

Figure 1A:
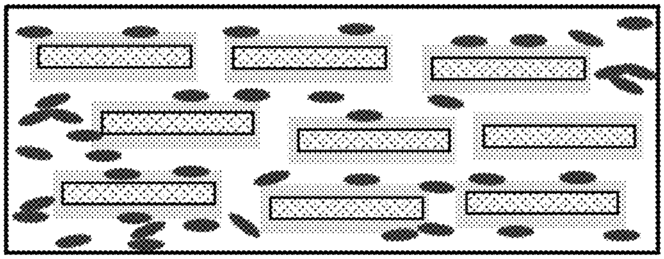

USE OF COLORED EFFECT PIGMENTS FOR ENHANCING THE INFRARED ABSORPTION CAPACITY OF COLORED POLYMERS

The present invention is related to the use of colored effect pigments for enhancing the infrared absorption capacity of colored polymers and to a method for enhancing the infrared absorption capacity of colored polymers.

Pearlescent pigments open up new dimensions in color design when used in plastic applications. Usually, pearlescent pigments are based on flaky substrate particles which are covered with one or more interference layers of materials exhibiting refractive indices which are different from each other. In most cases, metal oxides are used for these interference layers. Through the multiple reflection of light, unique luster and color effects emerge from such a layer sequence in the effect pigments and impart interesting optical characteristics to plastic parts colored therewith. Owing to their chemical structure, most decorative effect pigments exhibit infrared reflecting characteristics.

For some polymer applications in plastic industry, it is, however, desired that the colored polymer has infrared absorbing characteristics. Heating by means of infrared radiation is extensively used in industry, particularly for heating or drying of polymer materials. Some examples are injection blow molding processes, injection stretch blow molding processes, thermoforming processes, rapid prototyping, curing processes or welding processes for polymer materials.

Heating or re-heating of polymer materials by infrared radiation has specific advantages over other forms of heating such as e.g. convection ovens, in that the emitted radiation is absorbed only by the polymer part to be processed and not by surrounding air or objects. Energy efficiency is ensured thereby and the expense for the respective apparatuses is limited. Thus, infrared heating is an important component in many polymer processing methods. The unique properties of infrared heat such as targeted heat, quick heating, quick cool-down and precise temperature control lead to efficient polymer processing in plastic industry.

In order to provide polymer materials with infrared absorbing characteristics, several proposals were made in the past.

In EP 1 756 221 B1, the use of inorganic materials for improving the reheat characteristics of a polymeric material was suggested, wherein the inorganic material is selected from titanium nitride, indium tin oxide, reduced indium tin oxide and antimony tin oxide. The respective polymeric material includes at least 1 ppm and at most 500 ppm of such an infrared absorbing material. The inorganic material is composed of particles having a maximum dimension of less than 10 μm.

In case the polymeric material shall be colored, either the blue colored titanium nitride is used or grey or black pigments such as carbon black, iron oxides, copper chromite or metallic antimony are additionally added for this purpose.

For achieving colors other than blue, black or grey, the addition of near-infrared dyes is necessary.

In U.S. Pat. No. 8,932,512 B2, polymers having a high infrared absorption capacity are described. Here, colorless polymer compounds contain pale or transparent spherical, flake-form or needle-shaped particulate semiconductor materials or particulate substrates coated with pale or transparent semiconductor materials. The particulate substrates may be selected, inter alia, from mica flakes, glass flakes, $SiO_2$ beads, $TiO_2$ beads, $TiO_2$ needles etc., whereas the semiconductor materials are e.g. indium oxide, antimony oxide, tin oxide or zinc oxide.

Since the object of this invention was to provide transparent or colorless polymer compounds with an enlarged infrared absorbing capacity, the corresponding IR-absorbing additives are pale or transparent colorless in order to not disturb the color characteristics of the resulting plastic parts.

In the documents cited above, the infrared absorbing additives exhibit only very limited color characteristics or are transparent and/or colorless by nature. Therefore, there is still a need to provide plastic parts which are produced from polymers with attractive effect colors and high gloss and/or glittering and, at the same time, with good infrared absorbing properties without overloading them with particulate additives which may hamper their application characteristics.

Thus, the object of the present invention is to find particulate additives being able to provide polymer compositions with attractive colors and gloss and/or glittering effects and, at the same time, providing a sufficient infrared absorption capacity to the polymer composition without the need of further infrared absorbing additives or further coloring additives.

In addition, it is an object of the present invention to find a method for enhancing the infrared absorption capacity of colored polymers by addition of an additive which is capable to provide color as well as infrared absorbing properties to polymer compositions.

The object of the present invention is achieved by the use of colored effect pigments for enhancing the infrared absorption capacity of colored polymers, wherein the colored effect pigments comprise at least one layer which is composed of carbon.

In addition, the object of the present invention is achieved by a method for enhancing the infrared absorption capacity of colored polymers, wherein a polymer composition is mixed with a colored effect pigment which comprises at least one layer which is composed of carbon, in an amount of from 0.1 to 10% by weight, based on the weight of the total of effect pigment and polymer composition, whereby the polymer composition is provided with color and enhanced infrared absorption characteristic.

Infrared radiation in the sense of the present invention is meant to mean radiation in the wavelength range of from 750 to 3000 nm of the solar spectrum. The infrared wavelength range is split into Near Infrared with a wavelength range of from 750 nm to 1,400 nm and Short-Wave Infrared with a wavelength range of from 1,400 nm to 3,000 nm.

"Colored" in the sense of the present invention is meant to mean any color which may be provided by interference pigments, including black, white and grey shades besides usual "colorful" colors and including metallic shades such as silver, gold, bronze and copper as well.

As described earlier, it is known in the art that flaky effect pigments may be used to provide polymer compositions with glossy and/or glittering effects as well as pronounced interference colors. Nevertheless, most flaky effect pigments known in the art are infrared reflecting due to their layered composition, like their reflection behavior in the visible light spectrum.

Furthermore, it was also known in the art that carbon black particles absorb infrared radiation to a certain extent. They may be incorporated into polymer materials as well, but, without severe darkening of the polymer composition, effective infrared absorption thereof may not be achieved.

Thus, the present inventors were challenged by the request for providing additives which, at the same time, exhibit the coloristic characteristics of interference pigments and the infrared absorption properties of carbon black without exhibiting the disadvantages which might occur if both additives are used in combination thereof in polymer compositions.

Surprisingly, the present inventors did find out that usual colored effect pigments could be amended to exhibit the desired optical and infrared absorbing characteristics if they comprise at least one layer which is composed of carbon, without exhibiting the disadvantages of a mixture of carbon black particles with colored effect pigments in a similar application medium.

To find the applicable balance of interference color and infrared absorbing property, it was necessary to design said at least one carbon black layer of the colored effect pigment in a conformal and homogeneous manner to provide the requested infrared absorption characteristics without diminishing the coloristic characteristics of effect pigments exhibiting interference colors.

To this end, colored effect pigments which are based on flaky substrate particles which are coated with at least one interference layer and with at least one layer being composed of carbon have been found useful.

In order to find the right balance between infrared absorption and darkening of the color characteristics of the interference layer(s), it has turned out that the layer composed of carbon is at best located on top of the flaky substrate particle coated with at least one interference layer and forms, thus, the outermost layer of the colored effect pigment (outermost in the sense of: the outermost layer which determines the coloristic characteristics of the respective pigment). In the outermost layer composed of carbon, the carbon content is 100% by weight, based on the weight of the layer composed of carbon. The carbon is present in this layer as a mixture of nanocrystalline carbon and amorphous carbon in a ratio of from 5:95 to 95:5, in particular of from 20:80 to 80:20. The respective contents of amorphous carbon and of nanocrystalline carbon depend on the carbon source and reaction temperature in the respective carbon coating process. A higher content of nanocrystalline carbon than the content of amorphous carbon is preferred in the layer composed of carbon.

The layer composed of carbon constitutes a pinhole-free, continuous, conformal and homogeneous layer, preferably as outermost layer (i.e. the outermost layer which determines the coloristic characteristics) of the effect pigment used in the present invention.

The geometrical thickness of the layer composed of carbon is in the range of from 1 to 10 nm, preferably in the range of from 1 to 6 nm, but may also be as low as in the range of from 1 to 2 nm in advantageous embodiments.

Astonishingly, such an ultrathin layer composed of carbon is capable to provide the requested infrared absorption characteristics to a polymer composition provided with the effect pigment, although the concentration of the effect pigment in the polymer composition is low, as will be described later.

A geometrical layer thickness of this layer of lower than 1 nm would not be sufficient to provide the effect pigment with the desired infrared absorption capability in the polymer, whereas a layer thickness of larger than 10 nm would darken the effect pigment in a manner that the interference color(s) would become dirty and the infrared absorption capability would be so high that the resulting colored polymer composition could hardly be managed in the requested heating process with infrared radiation due to a very high working temperature and too long cool-down processes resulting therefrom.

The geometrical thickness of the layer composed of carbon may be determined in a usual manner via examination of cross section images.

The content of carbon in the effect pigment is in the range of from 1 to 10% by weight, based on the weight of the effect pigment in total.

Suitable flaky substrate particles for the effect pigments used in the present invention are synthetic mica flakes, natural mica flakes, glass flakes, $Al_2O_3$ flakes, $SiO_2$ flakes or $Fe_2O_3$ flakes which are coated with one or more interference layers. The number of interference layers may be 2, 3, 4, 5 or 7, preferably 1, 2 or 3.

For the interference layers, low refractive materials and/or high refractive materials are used, such as for example $SiO_2$, $Al_2O_3$, Al(O)OH, $B_2O_3$, $MgO*SiO_2$, $CaO*SiO_2$, $Al_2O_3*SiO_2$, $B_2O_3*SiO_2$ or $MgF_2$ as colorless materials for low refractive layers and for example $TiO_2$, $ZrO_2$, $SnO_2$, ZnO, $Ce_2O_3$, $Fe_2O_3$, $Fe_3O_4$, $FeTiO_5$, $Cr_2O_3$, COO, $Co_3O_4$, $VO_2$, $V_2O_5$ or NiO as colored or colorless materials for high refractive layers. High refractive materials and low refractive materials may favorably be used in alternation for multilayered stacks on the flaky substrate particles.

Interference layers made of these materials exhibit geometrical layer thicknesses in the range of from 20 to 400 nm, preferably 30 to 300 nm, especially 30 to 200 nm, each.

Preferred are $TiO_2$ as high refractive material and $SiO_2$ as low refractive material. Especially preferred is a single layer of $TiO_2$ or a layer sequence of $TiO_2$—$SiO_2$—$TiO_2$ on the flaky substrate particle just below the outermost layer composed of carbon.

The basic effect pigments which are usually colored (providing interference colors and/or absorption colors) and are composed of the flaky substrate particle coated with at least one interference layer (without the layer composed of carbon) are available in the market from several commercial providers. They exhibit particle sizes in the range of from 1 to 400 μm, preferably of from 5 to 200 μm and especially of from 5 to 100 μm. The particle size and the particle size distribution can be determined by various methods which are usual in the art. However, preference is given in accordance with the invention to the use of the laser diffraction method in a standard method by means of a Malvern Mastersizer 3000, APA300 (product from Malvern Instruments Ltd., UK). This method has the advantage that particle size and particle size distribution can be determined simultaneously under standard conditions.

These commercially available colored basic effect pigments are amended by the layer composed of carbon as described above to being useful for the application as infrared absorbing capacity enhancing additive in the sense of the present invention.

In order to provide the commercially available colored effect pigments with the requested layer composed of carbon, the basic effect pigments are supposed to be carbon coated in a fluidized bed assisted CVD process which is operated at temperatures ranging from 200 to 900° C., in particular in the range of from 500 to 700° C. The carbon source (i.e. the carbon precursor) is selected from the group consisting of carbon containing organic solvents, in particular solvents which decompose at temperatures below 500° C., such as ethanol, isopropanol, 2-methyl-3-butin-2-ol, sugar compounds such as confectioner's sugar, glucose, fructose, dextrose, or any other sugars known to a person skilled in the art, acetone and toluene. Acetone and toluene are especially preferred. The carbon precursor can be in liquid, solid or gaseous form. A mixture two or more of solid, liquid and gaseous carbon precursors is also possible. It is also possible to use as a carbon precursor a mixture of different organic solvents or a mixture of different sugars or a mixture of sugar and solvent. These solvents can be injected into the reactor as finely sprayed liquid or as a gas. Nevertheless, acetone or toluene as single carbon source each are advantageously used.

The carbon source is fed into the reactor in a stream of carrier gas, which is an inert gas or a mixture of hydrogen and nitrogen. Argon or nitrogen may be used as inert gas, but nitrogen is preferably used. The carbon source may be used at room temperature or in a pre-heated form when fed into the reactor. By feeding into the gaseous carrier gas stream, the latter is enriched by the carbon precursor which is homogeneously distributed therein.

The reaction time is about 5 to 200 minutes, preferably 10 to 150 minutes. Within this reaction time, a compact, continuous outer layer composed of carbon is applied to the colored basic effect pigments.

After the thermal treatment, the resulting colored carbon coated effect pigments are cooled and classified. If necessary, one or more grinding processes can also be carried out before or after the classification for further separation of the pigments obtained.

The carbon coating process of the colored basic effect pigments can be carried out in a batch process or in a continuous process.

For some application media, it might be of advantage if the colored carbon coated effect pigments used according to the present invention are also finally provided with a so-called after-coating or after-treatment.

Such an after-coating or after-treatment takes usually place on the surface of the effect pigment being already provided with all layers which determine the coloristic characteristics of the effect pigment. It serves to adapt the effect pigments to their application requirement and may be composed of either organic or inorganic compounds or comprise a mixture of inorganic and organic components.

In case of inorganic compounds, dielectric compounds may be used. They are known to impart better dispersibility, lightfastness, etc., to effect pigments of different kinds and after-coatings made thereof are well known in the art. They possess thicknesses being in general smaller than 20 nm and especially between 1 and 15 nm. Dielectric compounds forming such thin after-treatment layers do not impart interference to the whole pigment system and do, therefore, not contribute to the coloristic characteristics of the resulting pigment. Usually, dielectric compounds used for this purpose are silicon dioxide, aluminum dioxide, cerium oxide and/or tin oxide, either as single components or in the form of mixtures.

In addition to or alternatively to inorganic dielectric layers for aftercoatings as described above, thin coatings of organic materials, e.g. of different organic silanes, organic titanates, organic zirconates, may also be applied as outermost coating to the surface of the pigments of the present invention to improve their application abilities in different application media. Such coatings are known in the art of effect pigments and their application is, therefore, within the ordinary skill of the person skilled in the art. Examples for the so called "aftertreatment" or "aftercoating" of effect pigments, either of organic or of inorganic nature, which may be employed in the present invention as described above, may be found in the following documents: EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805; the content thereof shall be enclosed in the present invention by reference.

The colored effect pigments which are used in the present invention are incorporated into the polymer composition in an amount in the range of from 0.1 to 10% by weight, based on the total weight of the thus pigmented polymer composition (i.e. based on the colored polymer). Preferably, the concentration of this special effect pigment is as low as in the range of from 0.5 to 2% by weight. Since the infrared absorption capacity of the special colored effect pigments used according to the invention is high, said low concentration is high enough to provide the resulting colored polymer with an adequate high infrared absorption capacity.

The polymers which may be provided with the infrared absorption enhancing additive according to the invention are thermoplastics or thermoset materials. Preferably, thermoplastic materials are used.

In a first aspect, the polymers are colored by the addition of the special colored effect pigments according to the invention which provide the polymers with attractive coloristic and glossy/glittering characteristics and do, in addition, also provide them with an enhanced infrared absorption capacity.

In a second aspect, besides the coloration of the polymers by the special colored effect pigments, it is of course possible that the polymers are additionally colored by using conventional absorption pigments, dyes or even conventional flaky effect pigments which do not comprise a layer composed of carbon. It goes without saying that, in case that particulate colorants, i.e. coloring pigments, are used for this purpose, the total amount of the special colored effect pigments used according to the present invention and the additional coloring pigments may not go beyond the maximum pigment load which is possible in the respective polymer application. In all cases, the concentration of the special colored effect pigments according to the present invention must be high enough to ensure the enhanced infrared absorbing capacity of the related polymer composition in comparison to a polymer composition which is, otherwise, composed of the same ingredients, but does not contain at least one layer composed of carbon in the colored effect pigment (i.e.: a colored effect pigment which corresponds to the basic part of the special colored effect pigment, i.e. simply not containing the carbon layer, is used).

As further coloring means, colored pigments or dyes which are well known in the art may be used. For example, organic as well as inorganic colorants and pigments and, particularly, effect pigments of any further kind may be used. Organic pigments and colorants are, for example azo pigments, diazo pigments, polycyclic pigments, cationic, anionic or non-ionic colorants. Inorganic colorants and pigments are, for example white pigments, colored pigments, black pigments or effect pigments. Examples for appropriate further effect pigments are metal effect pigments, pearlescent pigments or interference pigments, which are in general based on singly or multiply coated platelets of aluminum, mica, glass, $Al_2O_3$, $Fe_2O_3$, $SiO_2$, etc. Examples for the structure and characteristics of these pigments are disclosed, inter alia, in RD 471001 or RD 472005, the disclosure thereof shall be included in the present specification by reference.

In general, the colored polymer may also contain further additives which are generally used in the art, such as, for example, adhesives, solvents, fillers, stabilizers and/or surfactants which are heat-stable under the desired thermoforming working conditions As polymer materials for the colored polymers in the sense of the present invention, the following polymers shall be listed for example: polyethylene (PE, HDPE, LDPE), polypropylene (PP), polyamides, polyesters, polyesteresters, polyether-esters, polyphenylene ether, polyacetals, polyalkylene terephthalates, polyethylene naphthalate (PEN), polymethyl methacrylate (PMMA), polyvinylacetals, polyvinyl chloride (PVC), polyphenylene oxide (PPO), polyoxymethylene (POM), polystyrene (PS), acrylonitrile styrene (AS), acrylonitrile-styrene-acrylate (ASA), acrylonitrile-butadiene-styrene (ABS), styrene butadiene copolymer (SBC), polycarbonates (PC), polyether sulfones (polyurethanes (TPU), polyether ether ketones (PEEK), or copolymers or mixtures thereof.

As polyalkylene terephthalates, polybutylene terephthalate (PBT), polyethylene terephthalate (PET), polycyclohexylenedimethylene therephthalate (PCT) or polyethylene therephthalate glycol (PETG) are preferably used. They may also be used in their post-consumer recycled form (post-consumer recycled polyethylene terephthalate (PCRPET)) postindustrial recycled form (post-industrial recycled polyethylene terephthalate (PIRPET) or as regrind polyethylene terephthalate.

Depending on the kind of infrared heating procedure, the type of polymer may be used according to the special knowledge of the skilled person in the art. For instance, a polyalkylene terephthalate such as polyethylene terephthalate (PET) is often used for the production of beverage bottles and may undergo an injection stretch blow molding procedure.

The polymer materials which are provided with the special colored effect pigments according to the invention are supposed to be heated or reheated by action of infrared radiation. In detail, the heating or re-heating process is meant to mean a thermoforming process, an injection stretch blow molding process, a polymer welding process, a polymer drying process or a process for polymerizing and/or curing polymer materials. In all these processes, the presence of the special colored effect pigments according to the present invention imparts an enlarged infrared absorbing capacity to the respective polymer, compared with a polymer which is otherwise identical in its composition and does not contain the special colored effect pigment which comprises the at least one layer of carbon as described above. Astonishingly, the polymers provided with the special colored effect pigments according to the invention do exhibit also an enlarged infrared absorbing capacity in comparison to a colored polymer composition which exhibits the same color due to a mixture of flaky effect pigment (without carbon layer) and carbon black particles in a suitable amount.

The special colored effect pigments used in accordance with the present invention are incorporated into the respective polymer composition by any method known and used in the art. For example, the special effect pigments may be mixed with granules of the respective polymer composition and extruded or injection molded together with the polymer granules to give an intermediate product which is then processed later in an appropriate manner. The intermediate products formed in this way exhibit a very homogeneous distribution of the special colored effect pigments so that the subsequent thermoforming production steps may be carried out under favorable conditions.

Prior, during or after addition of the special colored effect pigments to the polymer composition granules it is furthermore possible to add additional but different coloring pigments or dyes and optionally additives such as, for example, adhesives, solvents, fillers, stabilizers and/or surfactants which are heat-stable under the desired working conditions of the thermoforming process to be executed in the following.

The present invention is also related to a method for enhancing the infrared absorption capacity of colored polymers, characterized in that a polymer composition is mixed with a colored effect pigment which comprises at least one layer which is composed of carbon, wherein the colored effect pigment is contained in the polymer composition in an amount of from 0.1 to 10% by weight, based on the weight of the total of colored effect pigment and polymer composition, whereby the polymer composition is provided with color and enhanced infrared absorption capacity.

Details with respect to the polymer compositions which may be used for the colored polymer of the present invention are discussed above to some extent. The composition of the special colored effect pigments which comprise at least one layer which is composed of carbon and their concentration in the colored polymer is discussed as well. All details in this respect do also apply to the method for enhancing the infrared absorption capacity of colored polymers.

The special colored effect pigments which comprise at least one layer which is composed of carbon provide the polymer composition with attractive colors (interference and/or absorption colors) and glossy, glittering or even metallic effects and ensure, at the same time, a high infrared absorption capacity of the resulting colored polymer. This high infrared absorption capacity may lead to either a reduced content of infrared absorbing additives in the polymer (in this case: reduced content of the special effect pigment in comparison to common infrared absorbing additives) or to a lower energy supply needed for the thermal processes conducted under infrared radiation.

In addition, the use of the special colored effect pigments according to the invention does also improve the UV-resistance of colored polymer compositions when compared with colored polymer compositions where carbon black particles are added to a polymer matrix being colored by usual effect pigments without a carbon containing layer thereon.

Due to the content of the special colored effect pigments in the colored polymer according to the present invention, the latter is capable of absorbing infrared radiation in the wavelength range of from 750 to 3000 nm of the solar spectrum in such an amount that the addition of further infrared absorbing additives is not necessary to enable the resulting polymer composition to be heated or re-heated in common thermoforming or similar processes executed under the influence of infrared radiation.

Therefore, the present invention is also related to a method for thermoforming, injection blow molding, injection stretch blow molding, welding, drying or curing of a colored plastic part, comprising irradiating said plastic part with infrared radiation in the wavelength range of from 750 to 3000 nm of the solar spectrum, wherein the plastic part is composed of a colored thermoplastic or thermosetting polymer composition comprising colored effect pigments which comprise at least one layer which is composed of carbon, wherein the colored effect pigments are present in the polymer composition in an amount of from 0.1 to 10% by weight, based on the weight of the total of effect pigment and polymer composition, and whereby the thermal conductivity of the colored plastic part is increased compared to an otherwise identical colored plastic part that does not contain said colored effect pigment having said at least one layer of carbon.

The colored plastic part in the sense of the present invention is either a product made of colored polymer compositions that finally needs to be cured, dried and/or polymerized, or is an intermediate product in a process that is supposed to be thermoformed or stretch blow molded. Thermoforming and stretch blow molding are preferred.

FIG. 1*a*: shows the distribution of carbon black in a polymer matrix containing common colored effect pigments and carbon black particles.

Figure 1B:
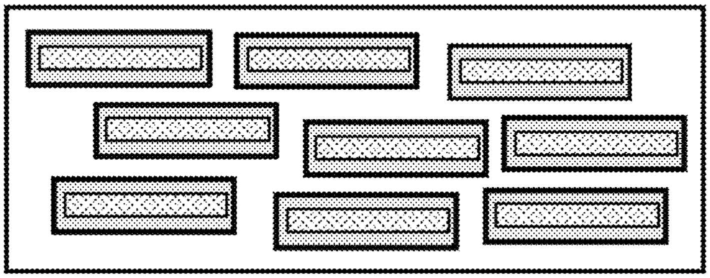

FIG. 1*b*: shows the distribution of carbon black in a polymer matrix containing the colored effect pigments according to the present invention.

Figure 2A:
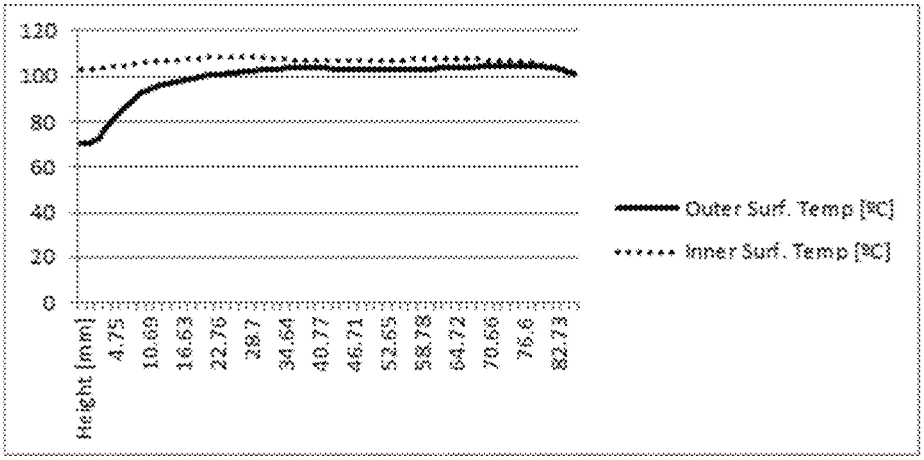

FIG. 2*a*: shows the difference in temperature between the surfaces inside and outside the preform in an ISBM process performed for 800 bottles per hour, 100% IR lamp energy, and the composition of comparative example 2.

Figure 2B:
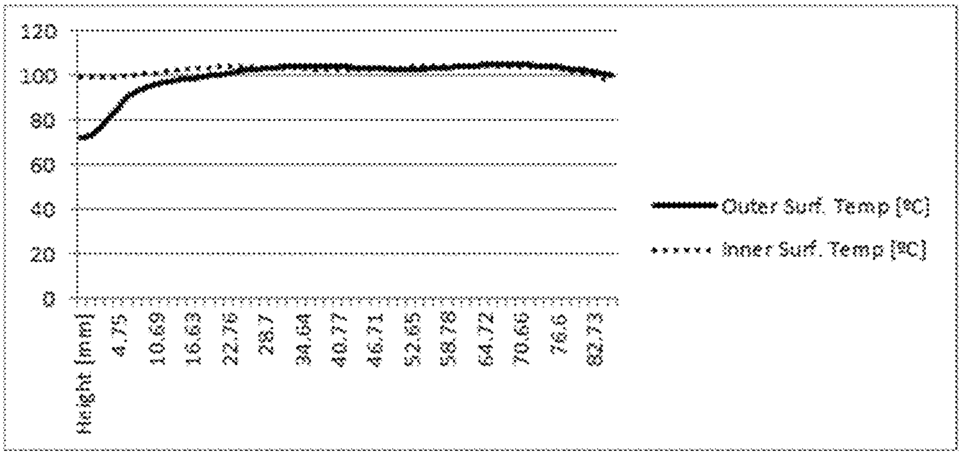

FIG. 2*b*: shows the difference in temperature between the surfaces inside and outside the preform in an ISBM process performed for 800 bottles per hour, 96% IR lamp energy, and the composition of example 2.

Figure 3:
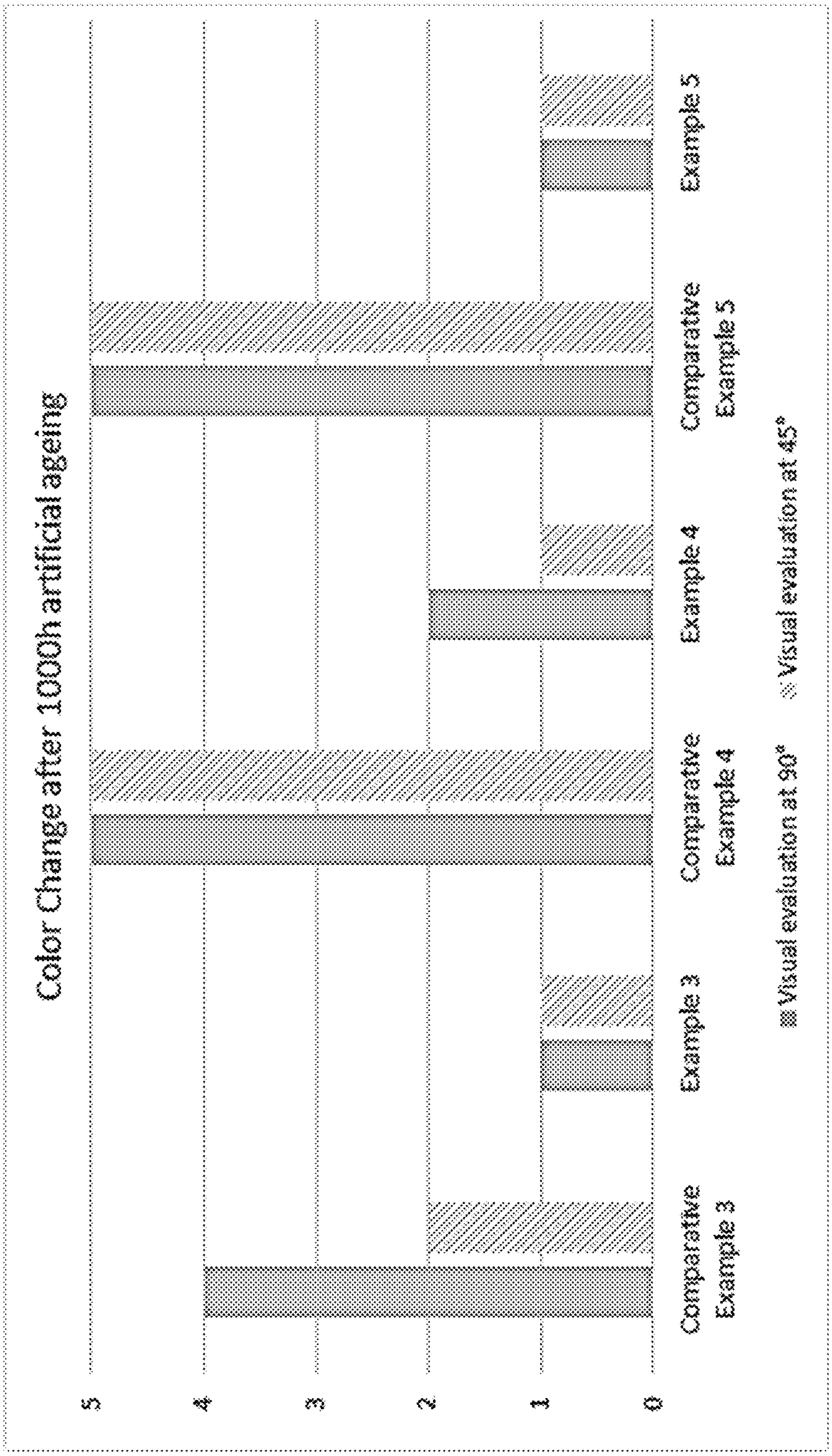

FIG. 3: shows a comparison of the color changes of plates produced according to examples 3, 4 and 5 and comparative examples 3, 4 and 5 after 1000 h artificial weathering.

Figure 4:
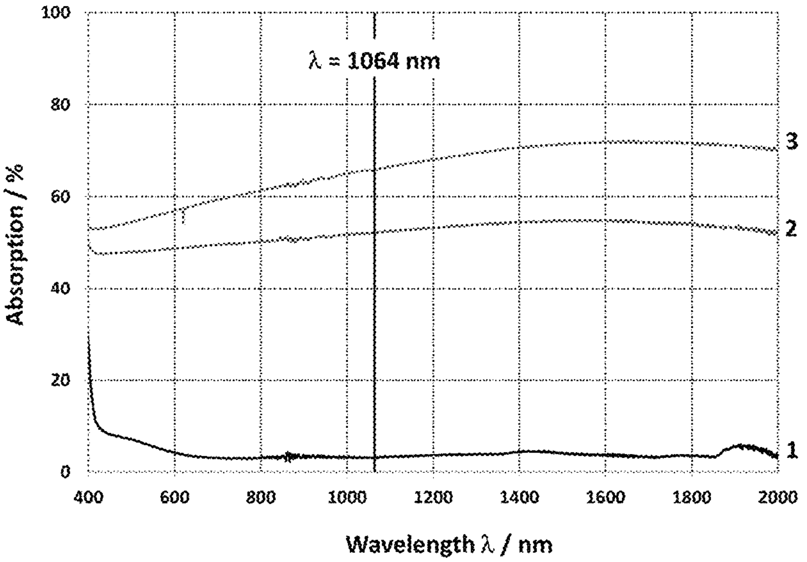

FIG. 4: shows the IR absorption capability of an uncoated colored effect pigment (1) (Iriodin® 6103 Icy White), of a carbon coated effect pigment used according to the present invention (3) (Iriodin® 6301 Icy White coated with about 1 wt. % carbon) and of a blend of uncoated colored effect pigment and carbon (2) (Iriodin® 6301 Icy White blended with about 0.01 wt. % carbon, based on 100 percent by weight of the blend).

The present invention is described in more detail in the following examples, but should not be limited to these.

Example 1 and Comparative Example 1

Thermoforming

A wide variety of plastic articles are made by a thermoforming method. Typically, a thermoforming system includes a source of a thermoplastic sheet material such as a roll unwinding station, a heating station to heat the thermoplastic sheet material and a thermoforming form press station, wherein the heated thermoplastic sheet material is formed by a vacuum-pressure system employing upper and lower platens to thermoform molded articles in the sheet material. A heating station for heating the thermoplastic sheet material is used to heat the top and/or bottom of the sheet material to a preselected temperature, usually ranging from 80° to 150° C. The preheat station, for example, may employ typical IR-heaters (quartz heaters for example).

For comparison of thermoforming characteristics of colored plastic parts according to the invention (example 1) and according to the prior art (comparative example 1) films having a thickness of 600 μm are produced from ABS (Terluran® GP22 from BASF SE) which are pigmented as follows:

Example 1: 1% by weight of a colored effect pigment used according to the present invention (Iriodin® 111 Rutil Fine Satin from Merck KGaA, Darmstadt, coated with 6 wt. % carbon, based on the weight of the resulting pigment). The pigment and the film made therewith exhibit a metallic grey color.

Comparative Example 1: 1% by weight of Iriodin® 111 Rutil Fine Satin and 0.05% Carbon Black (Printex® P60). The concentration of 0.05% Carbon Black is chosen to match the color of example 1. The resulting film exhibits a metallic grey color.

The films have a similar color. Parts are shaped from these films using a thermoforming machine from Formech (model 450DT) with 70% of the maximum emitter power. The heat-up time required for an optimum result which is comparable between the individual films is measured in each case (see Table 1). Film pieces measuring 10 cm×15 cm are used for the thermoforming tests and irradiated using a quartz emitter.

TABLE 1

| Polymer | Formulation | Heat-up time |
|---|---|---|
| Terluran ® GP22 | 1 wt. % pigment according to example 1 (i.e. 0.06 wt. % C in final polymer formulation) | 20 sec |
| Terluran ® GP22 | 1 wt. % pigment according to comp. ex. 1 + 0.05% Printex ® P60 (carbon black) | 30 sec |

As the measurement values show, the concentration of 1 wt. % of the colored effect pigment used in the present invention already has a small measurable influence in this plastic system. The final carbon concentration in the polymer corresponds to 0.06% C, however, a significant shortening of the heat-up time by 10 sec, i.e. about 30%, can be achieved.

In addition, the temperature of the film is measured after the heat-up time of 20 seconds. The results in Table 2 show a higher temperature for the plastic part according to example 1 in comparison to comparative example 1.

TABLE 2

| Polymer | Formulation | temperature after 20 sec Heat-up time |
|---|---|---|
| Terluran ® GP22 | Example 1 | 136° C. |
| Terluran ® GP22 | Comparative example 1 | 131° C. |

Heating of a pearlescent pigment containing polymer matrix by using IR will probably not be homogenous due to the different IR absorption nature of the polymer and the pearlescent pigment. The carbon black particles are non-homogeneously distributed in the polymer matrix and enhance the IR absorption correspondingly in a non-homogeneous manner. In contrast, the homogenous C layer deposited on top of the pearlescent pigment improves the heating-conductivity of the polymer formulation pigmented with the special pearlescent pigments according to the present invention.

The differences in distribution of carbon black in a polymer matrix according to the present invention and in a polymer matrix containing a common colored effect pigment and carbon black particles according to the prior art (ex. 1 and comp. ex.1) are shown in FIG. 1*a* (comp. ex. 1) and 1 b (ex.1).

Example 2 and Comparative Example 2

Injection Stretch Blow Molding (ISBM)

As known to a skilled person, the ISBM process starts with a first step where a thermoplastic material, typically a thermoplastic resin, is melted and then injected into a preform mold, so to form a preform. When the preform is then released from the preform mold it can be immediately processed, but more typically it is cooled and stored and processed at a stretch blow molding station at a subsequent time and/or location. In a second step the preform is introduced into a stretch blow molding equipment where the preform is blow molded to its final shape via heating (for example, IR-heating) and stretching, typically using a core rod. In the ISBM process, different to other blow molding processes, the preform is reheated to a temperature warm enough to allow the preform to be inflated so that a biaxial molecular alignment in the sidewall of the resulting blow-molded container is achieved. With the preform held at the neck, air pressure, and usually a stretch rod, are used to stretch the preform in the axial direction, and optionally also in the radial direction. In the case of bottles the neck portion of the article can contain threads or flanges suitable for a closure and are typically unchanged with respect to the preform as the neck part is often not stretched. The articles obtained by injection stretch blow-molding can be significantly longer than the preform.

An injection stretch blow molded (ISBM) bottle is prepared by way of injection molding a tubular preform followed by reheating and concurrently stretching and blow-molding the IR-heated preform into a container. The polymer composition pigmented in accordance with the invention can be used in all areas where thermoplastics are re-heated.

For making the preforms used in ISBM, a 20 wt. % masterbatch containing a pearlescent pigment (prior art, comparative example 2) or a modified pearlescent pigment (according to the invention, example 2) is produced. The carbon black content in the comparative example is chosen to match the color of the polymer composition according to example 2.

An Indorama Ventures resin product brand, Polyclear® PET 1101, as used in example 2 and comparative example 2 is a commercial grade copolymer packaging resin. It is typically used in carbonated soft drink bottles, packaging and other injection/stretch-blow molded applications. The pellets are dried at about 85° C. under vacuum for about 8 hours to remove residual moisture before use.

The polymer compositions having the ingredients as disclosed hereunder are injection-molded into preforms and further stretch-blow molded into 450 ml, 33 g bottles.

Preforms are made using a 150-ton injection molding machine which produces two preforms per shot. Each cylindrical preform weighing approximately 33 g is about 120 mm in length with a screw top base.

Polyester injection molding takes place at about 270° C. The preforms are blown into 450 ml bottles. Linear stretch is 2:1 maximum. Circumferential stretch is from 2.5:1 (flat face) to 4.5:1 at sides.

The preforms of example 2 and comparative example 2 are designed to exhibit a similar color. The final concentration of pigments in the formulation is as follows:

Example 2

1 wt. % colored effect pigment used according to the invention per 100 wt. % colored polymer composition (based on Iriodin® 6103 Icy White with 1 wt. % C deposited on pigment, i.e. 0.01 wt. % C in final polymer formulation). The pigment and the preform made therewith exhibit a metallic grey color.

Comparative Example 2

1 wt. % Iriodin® 6103 Icy White+0,005% Carbon Black (Printex® P60) per 100 wt. % colored polymer composition. The resulting preform exhibits a metallic grey color.

Set up was set at 800 bottles per hour, 100% IR lamp energy at the beginning for Comparative Example 2.

FIG. 2*a* shows a significant difference in temperature between the surfaces inside the preform and outside the preform when the process is performed in this way using the polymer composition according to comparative example 2 (“height” is the length of the resulting bottle from neck to bottom).

For example 2, it became immediately clear in pre-tests that there will occur a significant difference in inner and outer surface temperature of the preforms in case the production conditions as in comparative example 2 would be used. For this reason, the heater power reduction is possible and necessary. Thus, the energy of the IR lamp is reduced to 96%.

FIG. 2*b* shows the relation of inner and outer surface temperature for the production of 800 bottles per hour, 96% IR lamp energy, using the colored polymer composition of example 2.

Afterwards, the production speed is increased to 1000 bottles per hour at the IR lamp energy of 96%.

For example 2, no significant difference in inner/outer preform temperature is observed.

For comparative example 2, the production of good quality bottles at this high speed and with only 96% IR lamp energy failed. Instead, stretch marks, variable wall thicknesses of the bottles and malformed bottles are observed due to insufficient preform heating.

Examples 3, 4, 5 and Comparative Examples 3, 4, 5

UV Ageing

The colored polymer composition system pigmented in accordance with the invention can be used in all areas where thermoplastics have been employed to date. For outdoor applications, UV-resistance is of importance and is tested accordingly. Surprisingly, having C deposited on the basic colored effect pigment improves the UV-resistance of a colored polymer composition when compared with colored polymer compositions where carbon black particles are added to the polymer matrix colored with basic effect pigments.

Plastic granules (PMMA Plexiglas® 7N from Evonik Industries) are mixed with 0.2% wetting agent Process Aid 24 (product of ColorMatrix Group, Inc.) in a laboratory drum hoop mixer for 5 minutes. 1 wt % pearlescent pigment per 100% by weight polymer composition is added to the wetted granules and tumbled for additional 5 minutes.

The granules produced as described are then processed in an injection molding machine (Kraus-Maffei CX 130280) at 270° C. and molded into 1.5 mm thick plates.

The polymer plates are subjected to artificial weathering according to ISO 4892-2 (Xenotest® Beta+). Optically visible changes are assessed using the gray scale according to DIN EN 20105-A02 after 1000 h.

The polymer compositions include the following pigmentation (the polymer compositions of the comparative examples are chosen to match the color of the polymer compositions of the respective examples in each case):

Example 3

1% by weight colored effect pigment per 100% by weight colored polymer composition used according to the present invention (colored effect pigment based on Iriodin® 111 Rutile Fine Satin coated with 1.5 wt. % carbon). The pigment and the plates made therewith exhibit a metallic grey color.

Comparative Example 3

1% by weight of Iriodin® 111 Rutile Fine Satin+0.01% by weight Carbon Black (Printex® P60) per 100% by weight colored polymer composition. The resulting plates exhibit a metallic grey color.

Example 4

1% by weight colored effect pigment per 100% by weight colored polymer composition used according to the present invention (colored effect pigment based on Iriodin® 7205 Ultra Rutile Platinum Gold coated with 1.6 wt. % carbon). The pigment and the plates made therewith exhibit a dark golden color.

Comparative Example 4

1% by weight of Iriodin® 7205 Ultra Rutile Platinum Gold+0,015% Carbon Black (Printex® P60) per 100% by weight colored polymer composition. The resulting plates exhibit a dark golden color.

Example 5

1% by weight colored effect pigment per 100% by weight colored polymer composition used according to the present invention (colored effect pigment based on Xirallic® NXT T250-23 Galaxy Blue coated with 2 wt. % carbon). The pigment and the plates made therewith exhibit a metallic blue color.

COMPARATIVE EXAMPLE 5

1% by weight of Xirallic® NXT T250-23 Galaxy Blue+0.01% Carbon Black (Printex® P60). The resulting plates exhibit a metallic blue color.

In Table 3, the visual evaluation at 90° and 45° viewing angle of the polymer plates (color change according to grey scale) is demonstrated.

TABLE 3

| Formulation | Comp. Ex. 3 | Ex. 3 | Comp. Ex. 4 | Ex. 4 | Comp. Ex. 5 | Ex. 5 |
|---|---|---|---|---|---|---|
| Visual evaluation at 90° | +4 | +1 | +5 | +2 | +5 | +1 |
| Visual evaluation at 45° | +2 | +1 | +5 | +1 | +5 | +1 |

A comparison of the plates after 1000 h artificial weathering shows clearly less color changes using the pigments according to the present invention (examples 3, 4 and 5). A respective visualization is shown in FIG. 3.

Grey scales are used for assessing color change and staining during color fastness testing (here artificial weathering). It is used for visual assessment using a rating from 1 to 5, where 5 means “poor” and 1 means “good”. The illuminant/observer conditions are D65 with a visual evaluation angle of 90° and 45°.

In FIG. 4, the IR absorption capability of an uncoated colored effect pigment (1) (Iriodin® 6301 Icy White), of a carbon coated effect pigment used according to the present invention (3) (Iriodin® 6301 Icy White coated with about 1 wt. % carbon) and of a blend of uncoated colored effect pigment and carbon (2) (Iriodin® 6301 Icy White blended with about 1 wt. % carbon, based on 100 percent by weight of the blend) is shown.

In the following, the production of the carbon coated colored effect pigments used in the present invention is explained. The basic colored effect pigments used are all commercially available products of MerckKGaA, Darmstadt, Germany.

A) Production of carbon coated Iriodin® 111 Rutil Fine Satin used in example 1

1 kg of Iriodin® 111 Rutil Fine Satin pigment particles are heated up to 750° C. in a fluidized bed reactor (DI: 100 mm) under a constant inert gas atmosphere ($N_2$). Volumetric flow is adjusted to reach the minimal fluidization velocity of 2 mm/s, thus excellent mixing and heat and mass transfer properties are guaranteed. As soon as the reaction temperature of 750° C. is reached the C precursor toluene, preheated up to 90° C., is dosed to the fluidization flow. Due to the elevated reaction temperature the C precursor will decompose in a way that the growth of the C layer on the particles' surfaces is initiated. The CVD process is run for 90 min in order to achieve a C layer thickness of 6 nm. After a cooling phase under inert gas atmosphere ($N_2$) the final pigments are removed from the reactor and sieved.

B) Production of carbon coated Iriodin® 6103 Icy White used in example 2

1 kg of Iriodin® 6103 Icy White pigment particles are heated up to 650° C. in a fluidized bed reactor (DI: 100 mm) under a constant inert gas atmosphere (N2). Volumetric flow is adjusted to reach the minimal fluidization velocity of 2 mm/s, thus excellent mixing and heat and mass transfer properties are guaranteed. As soon as the reaction temperature of 650° C. is reached the C precursor acetone is dosed to the fluidization flow. Due to the elevated reaction temperature the C precursor will decompose in a way that the growth of the C layer on the particles' surfaces is initiated. The CVD process is run for 90 min in order to achieve a C layer thickness of about 1 nm. After a cooling phase under inert gas atmosphere (N2) the final pigments are removed from the reactor and sieved.

C) Production of carbon coated Iriodin® 111 Rutil Fine Satin used in example 3

1 kg of Iriodin® 111 Rutil Fine Satin pigment particles are heated up to 600° C. in a fluidized bed reactor (DI: 100 mm) under a constant inert gas atmosphere (N2). Volumetric flow is adjusted to reach the minimal fluidization velocity of 2 mm/s, thus excellent mixing and heat and mass transfer properties are guaranteed. As soon as the reaction temperature of 600° C. is reached the C precursor acetone is dosed to the fluidization flow. Due to the elevated reaction temperature the C precursor will decompose in a way that the growth of the C layer on the particles' surfaces is initiated. The CVD process is run for 120 min in order to achieve a C layer thickness of around 2 nm. After a cooling phase under inert gas atmosphere (N2) the final pigments are removed from the reactor and sieved.

D) Production of carbon coated Iriodin® 7205 Ultra Rutile Platinum Gold used in example 4

1 kg of Iriodin® 7205 Ultra Rutile Platinum Gold pigment particles are heated up to 658° C. in a fluidized bed reactor (DI: 100 mm) under a constant inert gas atmosphere (N2). Volumetric flow is adjusted to reach the minimal fluidization velocity of 2 mm/s, thus excellent mixing and heat and mass transfer properties are guaranteed. As soon as the reaction temperature of 658° C. is reached the C precursor acetone is dosed to the fluidization flow. Due to the elevated reaction temperature the C precursor will decompose in a way that the growth of the C layers on the particles' surfaces is initiated. The CVD process is run for 120 min in order to achieve a C layer thickness of around 2 nm. After a cooling phase under inert gas atmosphere (N2) the final pigments are removed from the reactor and sieved.

E) Production of carbon coated Xirallic® NXT T250-23 Galaxy Blue used in example 5

1 kg of Xirallic® NXT T250-23 Galaxy Blue pigments particles are heated up to 660° C. in a fluidized bed reactor (DI: 100 mm) under a constant inert gas atmosphere (N2). Volumetric flow is adjusted to reach the minimal fluidization velocity of 2 mm/s, thus excellent mixing and heat and mass transfer properties are guaranteed. As soon as the reaction temperature of 660° C. is reached the C precursor acetone is dosed to the fluidization flow. Due to the elevated reaction temperature the C precursor will decompose in a way that the growth of the C layer on the particles' surfaces is initiated. The CVD process is run for 75 min in order to achieve a C layer thickness of around 2 nm. After a cooling phase under inert gas atmosphere (N2) the final pigments are removed from the reactor and sieved.

The invention claimed is:

1. A method for enhancing the infrared absorption capacity of a colored polymer, comprising providing the colored polymer with colored effect pigments as an additive, wherein the colored effect pigments enhance the IR absorption capacity of the colored polymers, and wherein said colored effect pigments comprise at least one layer which is composed of carbon, and wherein the layer composed of carbon is the outermost layer of the colored effect pigments and consists of a mixture of nanocrystalline carbon and amorphous carbon in a ratio of 5:95 to 95:5.

2. The method according to claim 1, wherein the colored polymers absorb infrared light in the wavelength range of from 750 to 3000 nm of the solar spectrum.

3. The method according to claim 1, wherein the colored effect pigments are based on flaky substrate particles which are coated with at least one interference layer and with at least one layer being composed of carbon.

4. The method according to claim 1, wherein the layer composed of carbon is the outermost layer of the colored effect pigments and consists of a mixture of nanocrystalline carbon and amorphous carbon in a ratio of 20:80 to 80:20.

5. The method according to claim 1, wherein the layer composed of carbon has a geometrical thickness in the range of 1 to 10 nm.

6. The method according to claim 1, wherein the colored effect pigments have a particle size in the range of 1 to 400 μm.

7. The method according to claim 1, wherein the colored polymer is colored by the colored effect pigments.

8. The method according to claim 1, wherein the colored polymer is colored thermoplastics or colored thermoset materials.

9. The method according to claim 1, wherein the colored polymer is heated or re-heated by the action of infrared radiation.

10. The method according to claim 9, wherein the heating or re-heating by the action of infrared light is a thermoforming process, an injection molding process, an injection blow molding process, an injection stretch blow molding process, a polymer welding process, a polymer drying process or a process for polymerizing and/or curing polymer materials.

11. The method according to claim 1, wherein the colored polymer is selected from the group consisting of polyethylene (PE, HDPE, LDPE), polypropylene (PP), polyamides, polyesters, polyester-esters, polyether-esters, polyphenylene ether, polyacetals, polyalkylene terephthalates, polyethylene naphthalate (PEN), polymethyl methacrylate (PMMA), polyvinylacetals, polyvinyl chloride (PVC), polyphenylene oxide (PPO), polyoxymethylene (POM), polystyrene (PS), acrylonitrile styrene (AS), acrylonitrile-styrene-acrylate (ASA), acrylonitrile-butadiene-styrene (ABS), styrene butadiene copolymer (SBC), polycarbonates (PC), polyether sulfones (polyurethanes (TPU), polyether ether ketones (PEEK), and copolymers and mixtures thereof.

12. The method according to claim 1, wherein the colored effect pigments are present in the colored polymer in an amount of 0.1 to 10% by weight, based on the weight of the colored polymer.

13. A method for enhancing the infrared absorption capacity of colored polymers, comprising mixing a polymer composition with a colored effect pigment as an additive which comprises at least one layer which is composed of carbon, in an amount of 0.1 to 10% by weight, based on the weight of the total of effect pigment and polymer composition, wherein the polymer composition is provided with color and enhanced infrared absorption capability, and wherein the layer composed of carbon is the outermost layer of the colored effect pigments and consists of a mixture of nanocrystalline carbon and amorphous carbon in a ratio of 5:95 to 95:5.

14. The method according to claim 13, wherein the polymer composition absorbs infrared light in the wavelength range of 750 to 3000 nm of the solar spectrum.

15. A method for thermoforming, injection blow molding, injection stretch blow molding, welding, drying or curing of a colored plastic part, comprising irradiating said plastic part with infrared radiation in the wavelength range of 750 to 3000 nm of the solar spectrum, wherein the plastic part is composed of a colored thermoplastic or thermosetting polymer composition comprising colored effect pigments as an additive which comprise at least one layer which is composed of carbon, in an amount of from 0.1 to 10% by weight, based on the weight of the total of effect pigment and polymer composition, wherein the thermal conductivity of the colored plastic part is increased compared to an otherwise identical colored plastic part that does not contain said colored effect pigment having said at least one layer of carbon, and wherein the layer composed of carbon is the outermost layer of the colored effect pigments and consists of a mixture of nanocrystalline carbon and amorphous carbon in a ratio of 5:95 to 95:5.

16. The method according to claim 13, wherein the layer composed of carbon is the outermost layer of the colored effect pigments and consists of a mixture of nanocrystalline carbon and amorphous carbon in a ratio of 20:80 to 80:20.

17. The method according to claim 15, wherein the layer composed of carbon is the outermost layer of the colored effect pigments and consists of a mixture of nanocrystalline carbon and amorphous carbon in a ratio of 20:80 to 80:20.

18. The method according to claim 1, wherein the layer composed of carbon has a geometrical thickness in the range of 1 to 2 nm.

19. The method according to claim 1, wherein the layer composed of carbon is a homogeneous layer.

* * * * *